United States Patent [19]

Nakashima et al.

[11] Patent Number: 4,552,587
[45] Date of Patent: Nov. 12, 1985

[54] METHOD OF OPERATING LADLE REFINING FURNACE

[75] Inventors: Hirohisa Nakashima; Yoshimi Komatsu; Masafumi Ikeda; Tsuneo Kondo, all of Fukuyama, Japan

[73] Assignee: Nippon Kokan Kabushiki Kaisha, Tokyo, Japan

[21] Appl. No.: 674,567

[22] Filed: Nov. 26, 1984

[30] Foreign Application Priority Data

Sep. 28, 1984 [JP] Japan .............................. 59-145888[U]
Oct. 11, 1984 [JP] Japan .............................. 59-213093
Oct. 12, 1984 [JP] Japan .............................. 59-153759[U]
Oct. 12, 1984 [JP] Japan .............................. 59-153760[U]
Oct. 12, 1984 [JP] Japan .............................. 59-213332

[51] Int. Cl.$^4$ .............................................. C21C 5/52
[52] U.S. Cl. .............................................. 75/12; 75/59.3
[58] Field of Search ................................... 75/12, 59

[56] References Cited

U.S. PATENT DOCUMENTS 4,200,452  4/1980  Savov ............................ 75/12

Primary Examiner—Peter D. Rosenberg
Attorney, Agent, or Firm—Frishauf Holtz, Goodman & Woodward

[57] ABSTRACT

The invention relates to a method of operating a ladle refining furnace for blowing Ar gas through bubbling lances submerged in molten steel in a ladle to stir the molten steel. The flow rate and the rate of change in the flow rate of the Ar gas blown through the bubbling lances are adjusted to prevent the iron lumps from attaching to the bubbling lances.

10 Claims, 8 Drawing Figures

F I G. 1
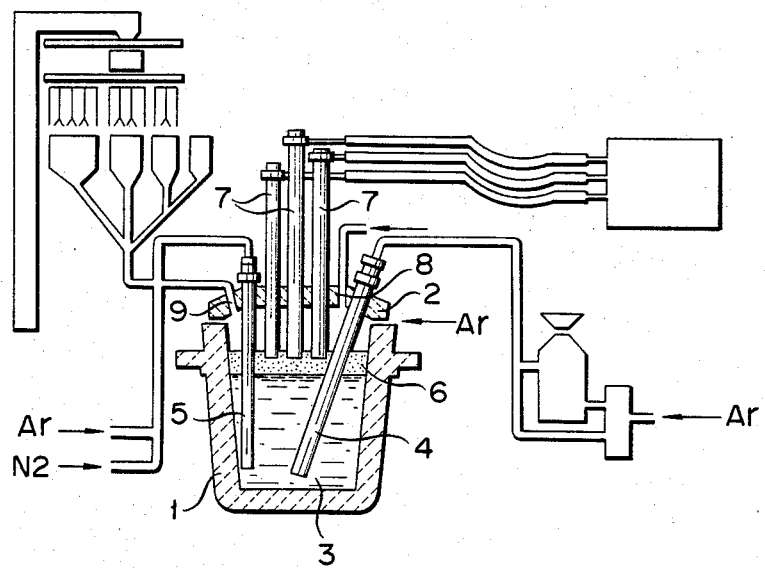
F I G. 2
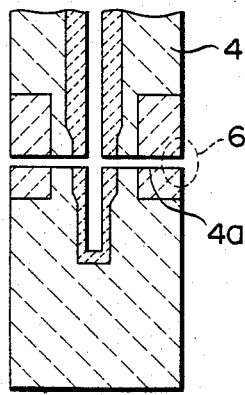
F I G. 3
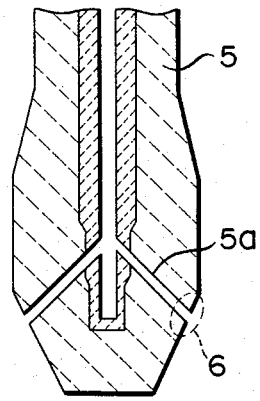

METHOD OF OPERATING LADLE REFINING FURNACE

BACKGROUND OF THE INVENTION

I. Field of the Invention

The present invention relates to a method of operating a ladle refining furnace in which a ladle is covered by a water-cooled cover, and Ar gas is blown into molten steel inside the ladle through bubbling lances so as to stir the molten steel.

II. Description of the Prior Art

In a ladle refining furnace which has bubbling lances submerged in molten steel, when a part of an Ar gas outlet port is damaged, the iron lumps attach to the melted portion, thus clogging the lances. When such clogging occurs, Ar gas cannot be easily blown, and the operation may have to be stopped temporarily.

According to the studies made by the present inventors, it was confirmed that attachment of the iron lumps is frequently caused when the lances are inserted into molten steel, the lances are withdrawn, and the Ar gas flow rate is decreased.

SUMMARY OF THE INVENTION

It is an object of the present invention to provide a method of operating a ladle refining furnace wherein even if a refractory material at a part of an Ar gas outlet port of a lance is damaged, iron lumps will not easily attach and clogging of the lances will be prevented.

In order to achieve the above object according to the present invention, when bubbling lances are submerged in molten steel in a ladle or are withdrawn, the flow rate of Ar gas blown into the molten steel from the bubbling lances is adjusted to be larger than that during bubbling, so that the attachment of iron lumps during insertion or withdrawal of the lances is prevented.

When the flow rate of Ar gas blown from the bubbling lances during the bubbling of molten steel is decreased, the rate of change in the flow rate of Ar gas is set to be as small as 200 l/min/min, thus preventing the attachment of iron lumps.

Another object of the present invention is to allow easy removal of the metal on a water-cooled cover by forming a coating of a refractory material on a water-cooled cover by blowing.

Yet another object of the present invention is to provide a cover stopper which can prevent damage to electrodes when a water-cooled cover is inadvertently shifted upon removal of a ladle by the attachment of iron lumps on the water-cooled cover and the ladle.

Another object of the present invention is to decrease the power consumption of electrodes for heating molten steel by providing a cover with a region of nonmagnetic material so as to prevent the occurence of an eddy current upon supplying power to the electrode.

A further object of the present invention is to automatically remove iron lumps attached to a ladle after refinement by means of a metal remover.

BRIEF DESCRIPTION OF THE DRAWINGS

FIG. 1 is a schematic sectional view showing the overall construction of an example of a ladle refining furnace for explaining a method according to the present invention;

FIG. 2 is a sectional view showing the position of an Ar gas outlet port of a bubbling lance for vigorously stirring molten steel shown in FIG. 1;

FIG. 3 is a sectional view showing the position of an Ar gas outlet port of a bubbling lance for lightly stirring the molten steel when the molten steel is heated as shown in FIG. 1;

DETAILED DESCRIPTION OF THE PREFERRED EMBODIMENT

Ladle Refining Furnace

Figure 4:
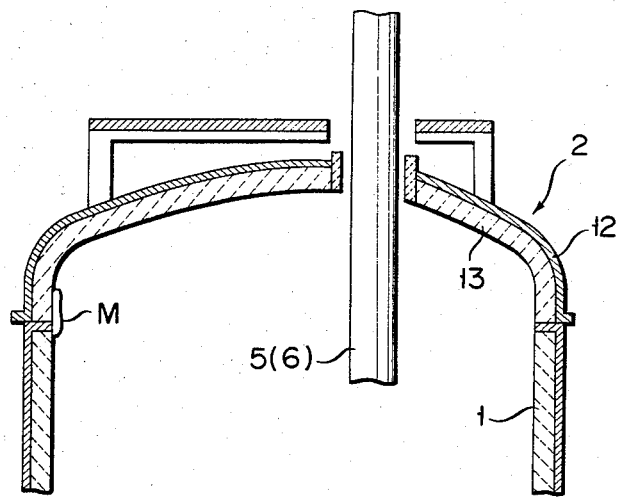
FIG. 4 is an enlarged sectional view showing the structure of a water-cooled cover shown in FIG. 1.

FIG. 1 shows an example of a ladle refining furnace for performing secondary steelmaking by Ar gas injection. Referring to FIG. 1, a water-cooled cover 2 is placed on a ladle 1. A pair of Ar gas bubbling lances 4 and 5 are submerged in molten steel 3 contained by the ladle 1. Three electrodes 7 are submerged in a slag layer 6 on the molten steel 3. An ar gas injection hole 8, an additive charging hole 9 and a sampling hole (not shown) are formed in the water-cooled cover 2. The addition of additives such as an alloy iron into the molten steel 3 through the charging hole 9, a supply of power to the electrodes 7 to heat the molten steel 3, and an injection of Ar gas through the bubbling lance 4 or 5 to stir the molten steel 3 are conducted in a predetermined sequence to adjust the composition or perform desulfurization or dephosphorization of the molten steel.

Structure of Bubbling Lance

The bubbling lance 4 is used to vigorously stir the molten steel when an alloy is added (at this time no power is supplied to the electrode). As shown in an enlarged view shown in FIG. 2, a plurality of outlet ports 4a are formed to extend transversely at the lower end of the lance 4. The bubbling lance 5 is for lightly stirring the molten steel when the molten steel is heated upon supplying power to the electrode. As shown in FIG. 3, a plurality of Ar gas outlet ports 5a are formed at downward oblique positions. In these outlet ports 4a and 5a, portions 6 indicated by dotted lines are most susceptible to clogging due to the attachment of iron lumps.

Flow Rate Control of Bubbling Lance

When the bubbling lance 4 is inserted in the ladle 1, the Ar gas flow rate is controlled to be about 1,500 to 2,000 l/min. When the bubbling lance 5 is inserted in the ladle 1, the Ar gas flow rate is controlled to be about 500 to 800 l/min. When the bubbling lance 4 or 5 is inserted in the molten steel, the flow rate of Ar gas is temporarily increased with respect to that during bubbling so as to enable them to withstand a negative pressure produced upon submersion of the lances in the molten steel. Similarly, when the bubbling lance 4 or 5 is pulled from the molten steel, the flow rate of Ar gas is also increased to a level above that during bubbling so as to prevent suction of the molten steel.

In order to prevent intake of molten steel, the Ar gas flow rate during insertion or withdrawal of the bubbling lances 4 and 5 is preferably 200 to 300 l/min higher than that during bubbling.

According to the present invention, during the stirring of the molten steel with Ar gas, flow rate control of the Ar gas is performed as needed. When the flow rate must be increased, it is done in a manner similar to that in a conventional method. However, when the Ar gas flow rate must be decreased, it is decreased at a very slow rate of 200 l/min/min or less. When the rate of change of the flow rate exceeds 200 l/min/min, suction of the molten steel due to a negative pressure occurs and the lances tend to become clogged.

In this manner, during insertion or withdrawal of the bubbling nozzles, the Ar gas flow rate or its rate of change is controlled. For this reason, the metal will not attach to the outlet ports and clogging of the nozzles can be prevented.

This effect was demonstrated by an Example performed by the present inventors.

Example

For a bubbling nozzle having an Ar gas flow rate of 1,500 to 2,000 l/min during stirring, the Ar gas flow rate was set to be 2,200 l/min during insertion and withdrawal of the nozzle. For a bubbling nozzle having an Ar gas flow rate of 500 to 800 l/min during stirring, the Ar gas flow rate was set to be 1,000 l/min during insertion and withdrawal of the nozzle. When the Ar gas was decreased, it was decreased at a rate of 200 l/min/min.

When ten refining operations were performed under these conditions, no clogging occurred.

However, when the Ar gas flow rate during insertion and withdrawal of the nozzle was not increased and the Ar gas flow rate during stirring was changed abruptly so as to decrease the Ar gas flow rate, clogging occurred after five refining operations.

Structure of Water-Cooled Cover

In a conventional water-cooled cover, a number of studs project inward from the inner surface of an iron shell having its outer surface cooled with water. A castable refractory material layer having a thickness of about 120 mm is formed on the inner surface.

In the water-cooled cover of this structure, the iron lumps tend to attach on the castable refractory material layer due to melting or cracking. The iron lumps which have become attached to the cover is removed after refinement. However, sometimes the metal has ingressed into the interior of the castable refractory material layer. Therefore, part of the iron shell is also cut when the iron lumps are cut, and water leakage tends to occur.

In this case, the iron shell must be welded or the water-cooled cover must be replaced with a new one. Such welding or the like is time-consuming, and the life of the water-cooled cover is short.

According to the present invention, the structure of the water-cooled cover is improved so as to solve the above problem. FIG. 4 shows an example of a water-cooled cover to be used in the method of the present invention. In a water-cooled cover 2 shown in FIG. 4, a refractory material is blown onto the inner surface (studs are not formed) of an iron shell 12, which is cooled by a plurality of cooling systems. A coating layer 13 is thus formed. The thickness of the coating layer 13 falls within the range of 5 to 30 mm and preferably 5 to 10 mm, depending on the function of a refractory material and cooling performance. The refractory material to be used can be a general refractory material consisting of 60% of $Al_2O_3$ and 40% of $SiO_2$ by weight.

In this water-cooled cover 2, when one refinement operation is completed with a ladle refining furnace, the coating layer 13 is completely peeled off, and a new coating layer is formed for the next refinement.

According to this method, since the coating layer 13 is relatively thin, cooling performance is good and iron lumps M will not easily attach to the cover. Even if the metal attaches, the coating layer 13 is cooled sufficiently and is not susceptible to melting or cracking. Thus, the iron shell will not be adversely affected. Furthermore, since no studs are formed, peeling of the coating layer 13 is facilitated and workability is improved.

Material of Water-Cooled Cover

In the water-cooled cover, the outer surface of the iron shell is cooled with water. A portion of the cover which can produce an eddy current upon the supply of power to the electrode is made of a nonmagnetic material. The reason for this will be described with reference to FIG. 5.

Figure 5:
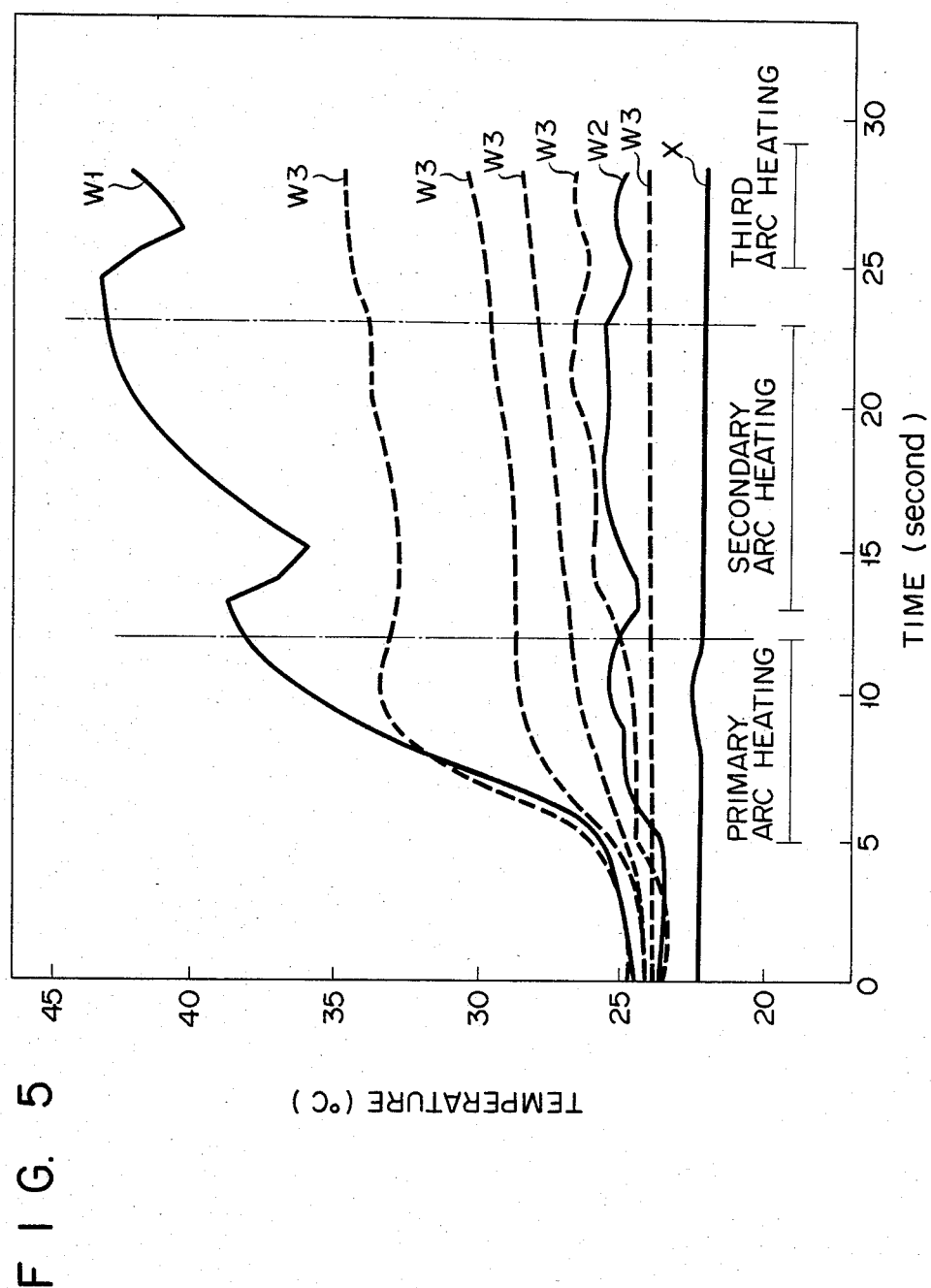
FIG. 5 is a graph showing changes, over a period of time, in the temperature of each cooling water system in a conventional water-cooled cover.

FIG. 5 shows changes in temperature of the respective cooling water systems in a conventional water-cooled cover wherein the entire portion of the cover to be formed of a metal is made of magnetic steel i.e., rolled steel for general structure.

Time is plotted along the abscissa, and the temperature of the cooling water exhaust system is plotted along the ordinate. FIG. 5 also shows the arc heating periods activated by supplying power to the electrodes. During the arc heating period, sampling of the molten steel or the like is performed. Curve X represents changes in the supply water, and curves W1, W2 and W3 represent changes in the cooling water after passing through the respective cooling water systems. In each cooling water system, when the molten steel is arc-heated upon the supply of power to the electrodes, the water-cooled cover 2 is heated by radiated heat from the molten steel and slag, and the temperature of the cooling water is increased. However in the cooling water system W1, the water temperature is higher than that in the other systems, and the temperature repeatedly increases and decreases. When a comparison is made between the temperature change pattern of the cooling water system W1 and the arc heating pattern, a precise correspondence is established. That is, when the electrode is powered, the water temperature is increased. When the electrodes are deenergized, the water temperature is decreased. The fact that the cooling water temperature is decreased means that the cooling water is heated by a heat source other than radiation from the molten steel. Considering the fact that the cooling water system W1 is near the insertion ports of the electrodes, the lances, and the additive (i.e. ferro alloy) charging hole, an abnormal rise of the cooling water temperature in the system W1 can be assumed to have been caused by resistive heating of the cover 2 due to an eddy current generated in the cover 2. The temperature of the cooling water system W2 changes similar to the cooling water system W1, although the magnitude of change is smaller in the former case. The cooling water system W2 is arranged to cool the vicinity of the central electrodes of the cover 2. Therefore, it is assumed that an eddy current also affects the cooling water system W2.

Therefore, the present inventors found that the temperature fluctuations in the cooling water systems W1 and W2 result from an eddy current from the electrodes. Based on this finding, the present inventors designed the present invention wherein a region subject to an effect of such an eddy current (influence of a magnetic field of the electrodes) is made of a nonmagnetic material. The regions of the water-cooled cover which may be subject to the effect of an eddy current are the portions surrounding the electrode through holes and the lance through holes. Stainless steel, which is nonmagnetic, may be conveniently used to form these portions. The remaining portion of the cover not subject to the influence of the eddy current can be made of rolled steel for general structure.

In a water-cooled cover of this structure, even when the electrode is powered, an eddy current is not generated, and an abnormal temperature rise in the cooling water is prevented. When an eddy current is generated in the water-cooled cover, power supplied to the electrode is consumed needlessly. However, in the arc-heated cover of the present invention, such power consumption by an eddy current is prevented.

Thermal loss due to an eddy current can be calculated as follows. A temperature decrease upon turning off a power source supplying power to the electrodes is assumed to be the calorific value of the heat generated by an eddy current and extracted by the cooling water from the cover. In this case, the extracted calorific value is given by the product of the cooling water volume and the temperature difference. Therefore, in the cooling water systems W1 and W2, the extracted calorific values are calculated to be $1.6 \times 10^3$ and $1.3 \times 10^3$ cal/min, respectively. Thus, a total of 2.9 cal/min is lost. This thermal loss amounts to 8.5% of the extracted calorific value of all the cooling water systems. Therefore, if the region conventionally subject to the effect of an eddy current is made of a nonmagnetic material, this thermal loss of 8.5% can be prevented.

Vibration-Resistant Unit of Water-Cooled Cover

After treatment in the ladle refining furnace, the water-cooled cover is raised and the ladle is removed. At this time, a force used to remove the ladle acts on the water-cooled cover 2 through iron lumps M attached to the inner surfaces of the ladle and the water-cooled cover. This may cause the water-cooled cover to swing.

The gap between the electrode through holes and the electrodes is about as narrow as 40 mm so as to be airtight, respectively. Therefore, when the water-cooled cover swings, the electrodes bump against the electrode through holes. This can cause chipping of some electrode immediately below the clamper. Then, the electrode falls into the ladle and is caught between the ladle and the water-cooled cover. The ladle cannot be removed in this case.

Figure 6:
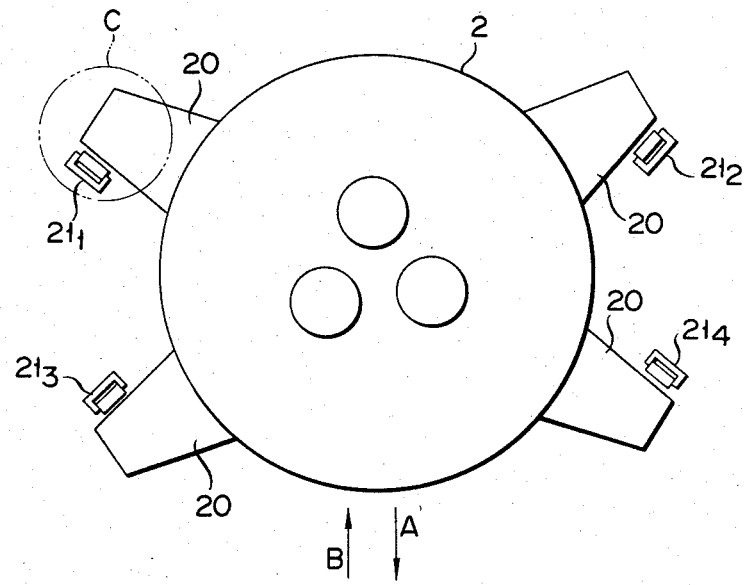
FIG. 6 is a plan view showing the structure of a vibration isolation unit of the water-cooled cover shown in FIG. 1.
Figure 7:
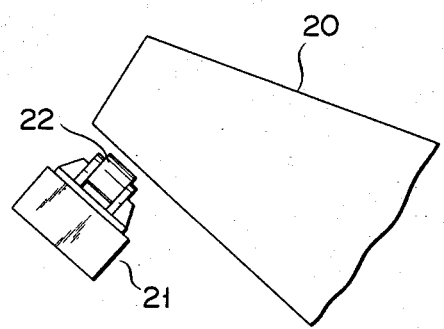
FIG. 7 is an enlarged sectional view of the vibration isolation unit.

FIGS. 6 and 7 show a water-cooled-cover vibration-resistant unit for preventing the above problem according to the present invention. In this unit, stoppers $21_1$ to $21_4$ are arranged so as to oppose the side surfaces of handles 20 of the water-cooled cover 2. Each stopper is supported by a suspended chain. Removal and insertion directions of the ladle 1 are represented by arrows A and B, respectively. The stoppers $21_1$ and $21_2$ prevent the water-cooled cover 2 from its movement along the direction of arrow A. The stoppers $21_3$ and $21_4$ prevent the water-cooled cover 2 from its movement along the direction of arrow B. As shown in FIG. 7, which is an enlarged portion C of FIG. 6, each stopper 21 has a roller 22. The roller 22 has its axis aligned with the longitudinal direction of the handle 20 and is slightly separated therefrom or contacts it. These rollers 22 allow smooth opening/closing of the water-cooled cover 2.

In the vibration-resistant unit of this structure, the stoppers 21 serve to prevent the swinging movement of the water-cooled cover along the removing or inserting directions (indicated by arrows A and B) of the ladle. Therefore, the water-cooled cover 2 will not move in these directions. Therefore, even if a slight amount of iron lumps M has become attached to the water-cooled cover 2 when the ladle 1 is removed after refinement, the electrodes 7 will not be chipped off by the swinging movement of the water-cooled cover 2. Furthermore, since the iron lumps need not be completely removed, the need for cutting off of the iron lumps is reduced, workability is improved, and productivity is improved.

The positions of the stoppers are not limited to those of the embodiment described above. The stoppers need only be arranged at positions where they are capable of preventing the swinging movement of the ladle.

Metal Remover

As has been described above, after the refinement in the ladle refining furnace, the water-cooled cover 2 is opened, the ladle 1 is removed, and the molten steel in the ladle 1 is treated in the next step. Prior to removing the ladle 1, the iron lumps M (which frequently attaches during the stirring of the molten steel) attached on the inner walls of the water-cooled cover 2 and the ladle 1 are removed.

Conventionally, this iron lumps cutting step is performed manually on a deck, resulting in time-consuming work and poor workability.

Figure 8:
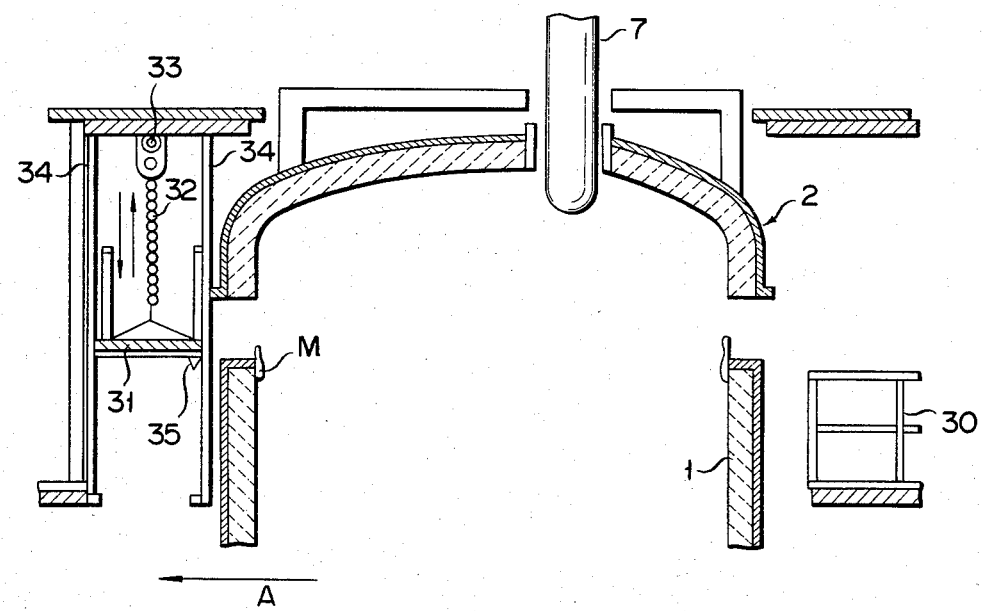
FIG. 8 is a sectional view showing a ladle refining furnace in which a cutter for removing the iron lumps attached to the ladle is mounted.

FIG. 8 shows the structure of a ladle refining furnace having an iron lumps remover according to the present invention. In this ladle refining furnace, ¾ of the entire circumference of the ladle 1 is surrounded by a stationary deck 30. A remaining ¼ of the circumference of the ladle 1, i.e., a side for removing or inserting the ladle, is surrounded by a movable deck 31. The movable deck 31 is suspended by a chain 32 so as to be vertically moved by a drive source 33. During refinement, the movable deck 31 descends along a plurality of rails 34. When the ladle is removed, the movable deck 31 is raised along these rails 34. The guide rails 34 serve to prevent transverse shifting or swinging movement of the movable deck 31. One or more cutting blades 35 are formed on the bottom surface of the movable deck 31 along the longitudinal direction or are arranged along the circumferential surface of the ladle 1.

During refinement, the movable deck 31 descends to a predetermined position. When the ladle is removed, the movable deck 31 is raised so that the cutting blades 35 are even with the iron lumps M at the open portion of the ladle 1. When the ladle A is removed along the direction indicated by the arrow A, the metal M abuts against the cutting blade 35. Since the metal M is hot, it is easily cut by the cutting blade 35. The movable deck 31 having the cutting blade 35 mounted thereon is prevented from transverse movement by the guide rails 34.

Therefore, cutting the iron lumps M by the cutting blade 35 is reliably performed.

The iron lumps remover need not be an assembly of a movable deck 31 and cutting blades 35. The iron lumps remover only needs to be capable of cutting the iron lumps M and to be adjustable in level in accordance with the level of the ladle 1.

In the iron lumps remover, the iron lumps can be automatically cut when the ladle is removed. Thus cutting efficiency is improved, and the manufacturing yield is improved due to the shorter time required for cutting.

What is claimed is:

1. A method of operating a ladle refining furnace having a ladle covered by a water-cooled cover and at least one bubbling lance that is submerged into, and subsequently withdrawn from, molten metal disposed in said ladle during the refining thereof, each bubbling lance flowing gas into said molten metal during refining and during submersion into and withdrawal from said molten metal, said method comprising the steps of:
    (a) adjusting the flow of said gas from said bubbling lance during said submersion and said withdrawal of said lance at a flow rate which is greater than the flow rate of said gas from said bubbling lance during stationary bubbling of the molten metal when said bubbling lance is stationary, and decreasing the flow rate of said gas from said bubbling lance when it is stationary after said submersion in said molten metal; and
    (b) adjusting said flow rate of said gas so that the rate of change in flow rate of said gas is not more than 200 l/min/min when the flow rate of said gas flowing through said bubbling lance is decreased after submersion of said bubbling lance into said molten metal.

2. A method according to claim 1, wherein the greater flow rate of step (a) is greater than said stationary flow rate by about 200 to 300 l/min.

3. A method according to claim 1, wherein a refractory material is blown onto an inner surface of an iron shell of the water-cooled cover of the ladle refining furnace to form a coating layer having a thickness of 5 to 30 mm, the inner surface of the iron shell not having studs formed thereon;
    the coating layer of the water-cooled cover is completely peeled off when refinement by the ladle refining furnace is completed; and
    another coating layer is formed on the inner surface of the iron shell and thereafter the next refinement is performed.

4. A method according to claim 1, wherein a region of the water-cooled cover which is subject to the generation of an eddy current upon the supply of power to an electrode is made of a nonmagnetic material.

5. A method according to claim 4, wherein portions surrounding through holes through which the electrodes extend respectively and surrounding through holes through which the lances extend respectively are made of a nonmagnetic stainless steel.

6. A method according to claim 1, wherein stoppers are arranged to oppose side surfaces of a plurality of handles projected transversely from the water-cooled cover so as to prevent the water-cooled cover from swinging, each of said stoppers having a roller which has an axis aligned with a longitudinal direction of said handles.

7. A method according to claim 1, wherein iron lumps remover is arranged near the ladle at a leading side thereof such that a level of the metal remover can be adjusted with respect to an opening of the ladle.

8. A method according to claim 7, wherein the metal remover comprises a cutting blade mounted on a bottom portion of a movable deck of the ladle refining furnace.

9. A method according to claim 1, wherein said gas comprises argon and said molten metal is steel.

10. A method according to claim 2, wherein said gas comprises argon and said molten metal is steel.

* * * * *